US010967626B2

(12) United States Patent
Ng et al.

(10) Patent No.: US 10,967,626 B2
(45) Date of Patent: Apr. 6, 2021

(54) PRINTHEAD MODULE FOR ADDITIVE MANUFACTURING SYSTEM

(71) Applicant: Applied Materials, Inc., Santa Clara, CA (US)

(72) Inventors: Hou T. Ng, Campbell, CA (US); Raanan Zehavi, Sunnyvale, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/510,774

(22) Filed: Jul. 12, 2019

(65) Prior Publication Data

US 2019/0351667 A1  Nov. 21, 2019

Related U.S. Application Data

(63) Continuation of application No. 15/265,618, filed on Sep. 14, 2016, now Pat. No. 10,350,876.
(Continued)

(51) Int. Cl.
*B22F 3/105* (2006.01)
*B33Y 30/00* (2015.01)
(Continued)

(52) U.S. Cl.
CPC .............. *B33Y 30/00* (2014.12); *B22F 3/008* (2013.01); *B22F 3/1055* (2013.01);
(Continued)

(58) Field of Classification Search
CPC ... B29C 64/264; B29C 64/153; B29C 64/295; B29C 64/209; B29C 64/236;
(Continued)

(56) References Cited

U.S. PATENT DOCUMENTS 6,092,941 A   7/2000 Imai
8,454,345 B2  6/2013 Silverbrook
(Continued)

FOREIGN PATENT DOCUMENTS

CN   102463746   5/2012
CN   203344320   12/2013
(Continued)

OTHER PUBLICATIONS

Office Action in Chinese Application No. 201680054039.9, dated Jan. 15, 2020. 5 pages (with English translation).
(Continued)

*Primary Examiner* — Joseph S Del Sole
*Assistant Examiner* — Lawrence D. Hohenbrink, Jr.
(74) *Attorney, Agent, or Firm* — Fish & Richardson P.C.

(57) ABSTRACT

A module for an additive manufacturing system includes a frame, a dispenser configured to deliver a layer of particles over a platen, an energy source to generate a beam to fuse the particles, and a metrology system having a first sensor to measure a property of the surface of layer before being fused and a second sensor to measure a property of the layer after being fused. The dispenser, first sensor, energy source and second sensor are positioned on the frame in order along a first axis, and the dispenser, first sensor, energy source and second sensor are fixed to the frame such that the frame, dispenser, first sensor, energy source and second sensor can be mounted and dismounted as a single unit from a movable support.

20 Claims, 8 Drawing Sheets

Related U.S. Application Data

(60) Provisional application No. 62/262,708, filed on Dec. 3, 2015, provisional application No. 62/219,605, filed on Sep. 16, 2015.

(51) Int. Cl.

| | | |
|---|---|---|
| *B29C 64/264* | (2017.01) | |
| *B29C 64/336* | (2017.01) | |
| *B29C 64/295* | (2017.01) | |
| *B22F 3/00* | (2021.01) | |
| *B29C 64/153* | (2017.01) | |
| *B29C 64/209* | (2017.01) | |
| *B29C 64/236* | (2017.01) | |
| *B29C 64/277* | (2017.01) | |
| *B33Y 10/00* | (2015.01) | |
| *B33Y 70/00* | (2020.01) | |
| *B33Y 50/02* | (2015.01) | |
| *B29C 64/165* | (2017.01) | |
| *B29C 64/205* | (2017.01) | |

(52) U.S. Cl.
CPC .......... *B29C 64/153* (2017.08); *B29C 64/209* (2017.08); *B29C 64/236* (2017.08); *B29C 64/264* (2017.08); *B29C 64/277* (2017.08); *B29C 64/295* (2017.08); *B29C 64/336* (2017.08); *B22F 3/003* (2013.01); *B22F 2003/1056* (2013.01); *B29C 64/165* (2017.08); *B29C 64/205* (2017.08); *B33Y 10/00* (2014.12); *B33Y 50/02* (2014.12); *B33Y 70/00* (2014.12); *Y02P 10/25* (2015.11)

(58) Field of Classification Search
CPC ... B29C 64/277; B29C 64/336; B29C 64/165; B29C 64/205; B33Y 10/00; B33Y 30/00; B33Y 50/02; B33Y 70/00; B22F 3/008; B22F 3/1055; B22F 3/003; B22F 2003/1056; Y02P 10/25
USPC .......................................................... 425/78
See application file for complete search history.

(56) References Cited

U.S. PATENT DOCUMENTS

| | | |
|---|---|---|
| 9,216,545 B2 | 12/2015 | Lee et al. |
| 9,764,515 B2 | 9/2017 | Yost et al. |
| 2004/0175451 A1 | 9/2004 | Maekawa |
| 2005/0136259 A1 | 6/2005 | Mohatity et al. |
| 2005/0158107 A1 | 7/2005 | Acher |
| 2005/0191016 A1 | 9/2005 | Ishikawa |
| 2005/0263933 A1 | 12/2005 | Welch, IV et al. |
| 2005/0280185 A1 | 12/2005 | Russell et al. |
| 2007/0196561 A1 | 8/2007 | Philippi et al. |
| 2007/0257394 A1 | 11/2007 | Borkenhagen et al. |
| 2008/0250953 A1 | 10/2008 | Whelan |
| 2010/0278952 A1 | 11/2010 | Silverbrook |
| 2013/0001834 A1 | 1/2013 | El-Siblani et al. |
| 2014/0175708 A1 | 6/2014 | Echigo |
| 2014/0271328 A1 | 9/2014 | Burris |
| 2014/0314613 A1 | 10/2014 | Hopkinson et al. |
| 2015/0014885 A1 | 1/2015 | Hofmann |
| 2015/0035186 A1 | 2/2015 | Teken |
| 2015/0174824 A1 | 6/2015 | Gifford et al. |
| 2015/0190963 A1 | 7/2015 | Lee et al. |
| 2016/0136895 A1 | 5/2016 | Beyer et al. |
| 2016/0207263 A1 | 7/2016 | Gordon |
| 2017/0021456 A1* | 1/2017 | Varetti ............... B23K 15/0026 |
| 2017/0036404 A1 | 2/2017 | Rengers et al. |
| 2017/0057013 A1 | 3/2017 | Gillespie |
| 2017/0072643 A1 | 3/2017 | Ng |
| 2017/0072644 A1 | 3/2017 | Ng et al. |
| 2017/0203513 A1* | 7/2017 | Chanclon ............... B33Y 40/00 |
| 2017/0341183 A1* | 11/2017 | Buller .................. B29C 64/268 |

FOREIGN PATENT DOCUMENTS

| | | |
|---|---|---|
| CN | 103717378 | 4/2014 |
| CN | 104385594 | 3/2015 |
| CN | 204235896 | 4/2015 |
| CN | 104708819 | 6/2015 |
| CN | 105579219 | 5/2016 |
| EP | 1201404 | 5/2002 |
| EP | 1631439 | 8/2007 |
| JP | 2005-335391 | 12/2005 |
| JP | 2006 205456 | 8/2006 |
| JP | 2009-220576 | 10/2009 |
| JP | 2014-527481 | 10/2014 |
| JP | 2015-128892 | 7/2015 |
| JP | 2015-139957 | 8/2015 |
| WO | WO 98/28124 | 7/1998 |
| WO | WO 2008/120183 | 10/2008 |
| WO | WO 2009/013751 | 1/2009 |
| WO | WO 2011/045291 | 4/2011 |
| WO | WO 2015038072 | 3/2015 |
| WO | WO 2015/094720 | 6/2015 |
| WO | WO 2015/106838 | 7/2015 |
| WO | WO 2015/108546 | 7/2015 |

OTHER PUBLICATIONS

Extended European Search Report in Application No. 16847279.3, dated Apr. 18, 2019, 7 pages.
Extended European Search Report in Application No. 16847244.7, dated Apr. 18, 2019, 8 pages.
International Search Report and Written Opinion in International Application No. PCT/US2016/051883, dated Dec. 21, 2016, 10 pages.
International Search Report and Written Opinion in International Application No. PCT/US2016/051760, dated Dec. 14, 2016, 11 pages.
Office Action in Chinese Application No. 201680054039.9, dated May 22, 2019, 11 pages (with English translation).
Office Action in Chinese Application No. 201680052198.5, dated Jun. 24, 2019, 9 pages (with English translation).
JP Office Action in Japanese Application No. 2018-513666, dated Aug. 21, 2020, 33 pages (with English translation).
EP Office Action in European Appln. No. 16847244.7, dated Dec. 16, 2020, 7 pages.

* cited by examiner

PRINTHEAD MODULE FOR ADDITIVE MANUFACTURING SYSTEM

CROSS-REFERENCE TO RELATED APPLICATIONS

This application is a continuation of U.S. patent application Ser. No. 15/265,618, filed Sep. 14, 2016, which claims priority to U.S. Provisional Patent Application Ser. No. 62/262,708, filed on Dec. 3, 2015, and to U.S. Provisional Patent Application Ser. No. 62/219,605, filed on Sep. 16, 2015, the entire contents of each being incorporated by reference.

TECHNICAL FIELD

This invention relates to additive manufacturing, and more particularly to a 3D printing process in which a layer of powder is dispensed, fused and formed into a 3-dimensional shape.

BACKGROUND

Additive manufacturing (AM), also known as solid freeform fabrication or 3D printing, refers to any manufacturing process where three-dimensional objects are built up from raw material (generally powders, wires, liquids, suspensions, or molten solids) in a series of two-dimensional layers or cross-sections. In contrast, traditional machining techniques involve subtractive processes and produce objects that are cut out of a stock material such as a block of wood or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains (or particles), e.g., powders, to create objects. Sintering usually involves heating a powder. When a powdered material is heated to a sufficient temperature (typically lower than the melting point) in a sintering process, the atoms in the powder particles diffuse across the boundaries of the particles, fusing the particles together to form a solid piece. In contrast to melting, the powder used in sintering need not reach a liquid phase. As the sintering temperature does not have to reach the melting point of the material, sintering is often used for materials with high melting points such as tungsten and molybdenum.

Both sintering and melting can be used in additive manufacturing. The material being used determines which process occurs. An amorphous solid, such as acrylonitrile butadiene styrene (ABS), is actually a supercooled viscous liquid, and does not actually melt; as melting involves a phase transition from a solid to a liquid state. Thus, selective laser sintering (SLS) is the relevant process for ABS, while selective laser melting (SLM) is used for crystalline and semi-crystalline materials such as nylon and metals, which have a discrete melting/freezing temperature and undergo melting during the SLM process.

Conventional powder dispensing systems that use a laser beam or electron beam as the energy source for sintering or melting a powdered material typically direct the beam on a selected point in a layer of the powdered material and selectively raster scan the beam to locations across the layer. Once all the selected locations on the first layer are sintered or melted, the platform which supports the powder is moved downwards and a new layer of powdered material is deposited on top of the completed layer. The process is repeated layer by layer until the desired object is produced.

SUMMARY

In one aspect, a module for an additive manufacturing system includes a frame configured to be removably mounted on a movable support, a dispenser configured to deliver a layer of particles on a platen that is separate from the frame or an underlying layer on the platen, a heat source configured to heat the layer of particles to a temperature below a temperature at which the particles fuse, and an energy source configured to fuse the particles. The dispenser, heat source and energy source are positioned on the frame in order along a first axis, and the dispenser, heat source and energy source are fixed to the frame such that the frame, dispenser, heat source and energy source can be mounted and dismounted as a single unit from the support.

In another aspect, a printhead assembly for an additive manufacturing system includes a printhead support and a plurality of printhead modules removably mounted on the printhead support. Each printhead module is substantially identical in physical configuration. Each printhead module includes a frame removably mounted on the support and a dispenser configured to deliver a layer of feed material on a platen that is separate from the frame, or an underlying layer on the platen. The dispenser is fixed to the frame such that the frame and dispenser can be mounted and dismounted as a single unit from the support.

In another aspect, an additive manufacturing system includes a platen to support an object to be fabricated, the platen having a top surface, a printhead assembly movable relative to the platen in a direction parallel to the top surface, an actuator coupled to at least one of the printhead support and the platen to generate relative motion therebetween, and an energy source configured to fuse feed material. The printhead assembly includes a printhead support, and a plurality of printhead modules removably mounted on the printhead support. Each printhead module is substantially identical in physical configuration. Each printhead module includes a frame removably mounted on the support, and a dispenser configured to deliver a layer of particles on a platen that is separate from the frame, or an underlying layer on the platen. The dispenser is fixed to the frame such that the frame and dispenser can be mounted and dismounted as a single unit from the support;

Features of any of the above aspects can include one or more of the following. The dispenser may include a reservoir to hold the particles and a conduit coupled to the reservoir and extending along a second axis perpendicular to the first axis. The conduit may have a continuous slot or a plurality of apertures through which the particles are dispensed. The dispenser may include a rotatable auger positioned in the conduit to convey the particles along the second axis. The dispenser may include a plurality of nozzles and the dispenser is configured to eject the particles in a carrier fluid through the nozzles. The dispenser may be configured to dispense particles to a region on a second axis perpendicular to the first axis that extends beyond an edge of the dispenser. The dispenser is configured to dispense particles at least up to an edge of the frame. A roller or blade may extend along the second axis and be configured to smooth the layer of particles.

The heat source may include an array of heat lamps. The heat lamps may be disposed in a hexagonal closest packed array. The heat lamps may be arranged with vertical longitudinal axes, or with longitudinal axes at a non-zero angle relative to vertical. The energy source may be configured to generate a beam.

The energy source may be slidably mounted to the frame so as to be movable along a second axis perpendicular to the first axis, and the assembly may include a motor fixed to the frame and configured to move the energy source along the second axis such that a spot of impingement of the beam on the layer of particles is movable along the second axis. The energy source may be configured to deflect the beam along a second axis perpendicular to the first axis. The energy source may be a laser or an ion beam source. The energy source may include a digital micromirror device. The digital micromirror device may include a linear array of mirrors extending along a second axis perpendicular to the first axis.

A second dispenser may be fixed to the frame and configured to deliver a layer of second particles on the support or the underlying layer. The second dispenser may be positioned between the dispenser and the heat source. The second particles may have a different size or a different composition than the particles.

A metrology system may be fixed to the frame. The metrology system may include a sensor disposed before or after the dispenser in the order along the first axis. The metrology system may include a first sensor disposed before the dispenser in the order along the first axis and a second sensor disposed after the energy source in the order along the first axis. The metrology system may include a thermal imager or an optical camera.

Advantages of the foregoing may include, but are not limited to, the following. Components of the additive manufacturing system may be installed and removed as a unit, permitting easier construction and repair. For example, the printhead may be operable as a "plug and play" module. A standardized printhead configuration may enable scaling of additive manufacturing systems to accommodate the size of the object to be fabricated. The throughput, build bed size, resolution and/or quality of the additive manufacturing process may be improved.

DETAILED DESCRIPTION

Figure 1A:
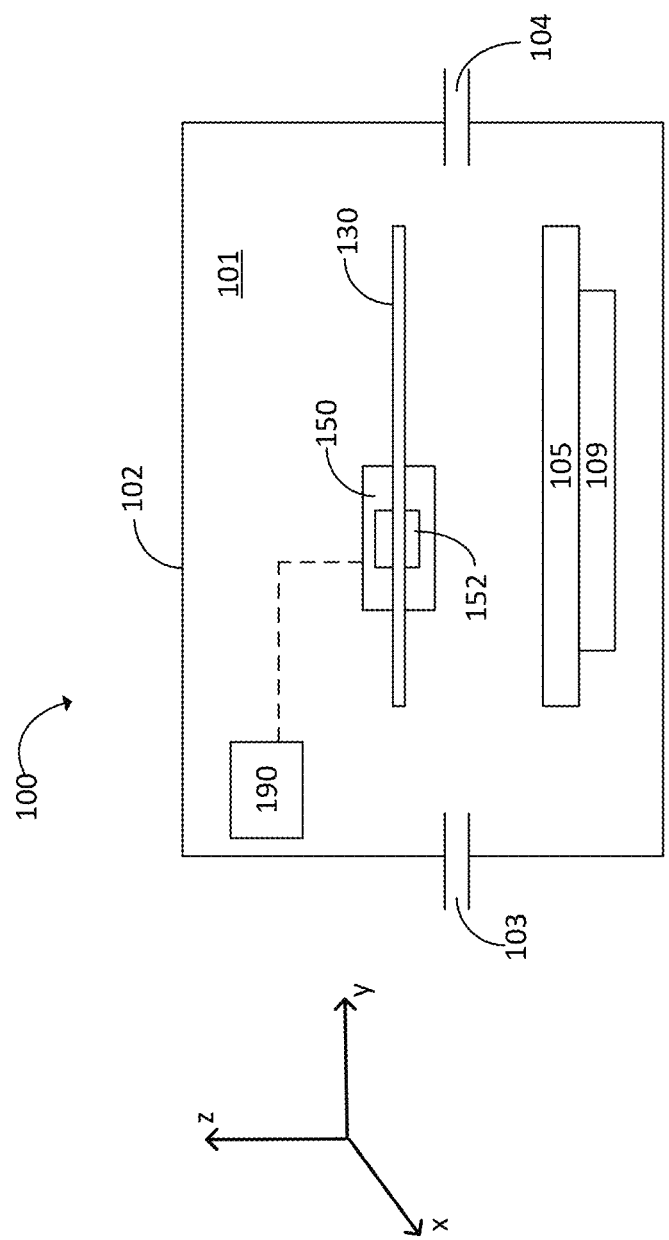
FIG. 1A illustrates a schematic of an exemplary additive manufacturing system.

An additive manufacturing system deposits a layer of feed material (for example, powders, liquids, suspensions, molten solids) on a platen, and then fuses portions of the layer of feed material. One or more feed material dispensers can deliver one or more feed materials to deposit the layer of feed material, and in some implementations the feed material can be selectively deposited by the one or more feed material dispensers. After the feed material is dispensed onto the platen, a spreader, for example, a roller or a blade, can spread the feed material over the platen to a higher uniformity or compaction, if desired. Fusing the desired portions of the layer of feed material can be achieved by supplying energy from one or more energy sources. The energy sources can apply energy to a spot, e.g., a single voxel at a time, or across an area, e.g., over multiple voxels simultaneously. For example, the energy source can include one or more lasers and/or arrays of heat lamps. The arrays of heat lamps can be located above or below the platen or elsewhere in the chamber of the additive manufacturing apparatus. Energy from the energy source heats up the feed material and causes it to fuse together to form a solid piece. The additive manufacturing system can also include one or more metrology systems that measure various parameters of the additive manufacturing process, for example, thermal/temperature uniformity, surface roughness or uniformity, image of the surface, and/or stress of the deposited feed material.

It is desirable to have a standardized printhead module that includes various printhead components, for example, a feed material dispenser, a heat source and an energy source. "Standardized" in this context indicates each printhead module is substantially identical in physical configuration (there can be software exceptions such as serial number or firmware version that vary between dispensers). The standardized printhead module simplifies construction and repair of additive manufacturing systems, e.g., the printhead module may be operable as a "plug and play" module that would be operable in any compatible additive manufacturing system. A standardized configuration of printhead modules can also enable scaling of additive manufacturing systems to accommodate the size of the object to be fabricated.

It is desirable to improve the throughput and build bed size of the additive manufacturing process. This can be achieved by performing the additive manufacturing process using a plurality of printhead modules.

The printhead modules can be removably mounted on a support to form a printhead assembly. The printhead assembly can include mechanisms, for example, actuators, that allow the printhead modules to move relative to one another. In addition, the printhead module can include mechanisms, for example, actuators, that allow the components in the printhead module to move relative to one another.

The printhead assembly can also include "global" printing components; for example, feed material dispensers, dispersion mechanisms, metrology systems and coolant dispensers, in addition to the printhead modules. In this context, "global" means that the components are directly mounted to the printhead support, rather than secured within a printhead, and are configured to affect or measure a region of the layer of feed material dispensed by multiple printheads.

Moreover, the printhead system can be mounted on or attached to a mechanism (for example, a robot arm, a cantilever or a gantry) that allows it to move relative to the platen.

FIG. 1A illustrates a schematic of an exemplary additive manufacturing system 100. The system 100 includes and is enclosed by a housing 102. The housing 102 can, for example, allow a vacuum environment to be maintained in a chamber 101 inside the housing, e.g., pressures at about 1 Torr or below. Alternatively the interior of the chamber 101 may be maintained under a desired gas environment, e.g., a gas that has been filtered to remove particulates, or the chamber can be vented to atmosphere. The gas can enter the chamber 101, from a gas source (not shown), through a gas inlet 103. The gas from the chamber can be removed through a vent (or outlet) 104.

The system 100 includes a platen 105 that receives or supports the layer of feed material. The platen 105 can include or be placed above a heater 109, e.g., a resistive heater or a lower lamp array, which can heat the platen 105 and thus heat the feed material deposited on the platen 105.

A printhead assembly that carries out the additive manufacturing process is positioned above the platen 105. The printhead assembly includes a printhead support configured to carry one or more printhead modules.

Each printhead module is removably mounted on the support. "Removably mounted" in this context means that the printhead can be installed such that the printhead is mechanically held in a fixed position relative to the support, but that the printhead module can be removed by use of standard hand-held construction tools, e.g., wrenches or power screwdrivers, and without damage to the printhead module or the printhead support. For example, a frame of the printhead module could have projections that engage surfaces of the support. For example, a flange projecting horizontally from the printhead module could rest on a rim of a portion of the support that surrounds the printhead module. When an operator desires to remove the printhead, the printhead is simply lifted out. Alternatively or in addition, a frame of the printhead module can be secured by mechanical fasteners, e.g., nuts and bolts, to the support. When an operator desires to remove the printhead, the bolts are loosened and the printhead is lifted out.

Figure 2:
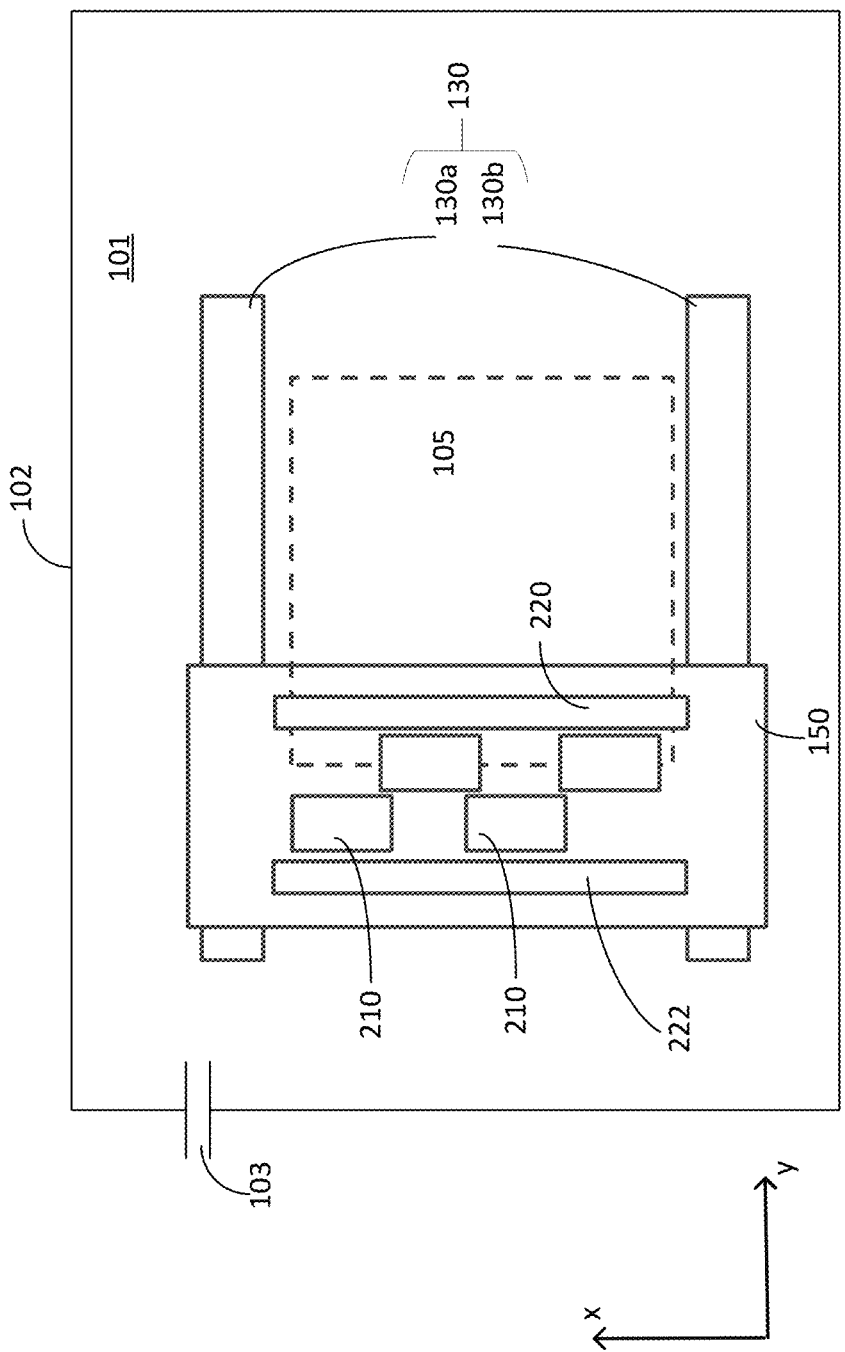
FIG. 2 is a top view of the additive manufacturing system illustrated in FIG. 1A.

In the example of FIG. 1A, the printhead support is provided by a printhead platform 150 that is configured to carry one or more printhead modules 210 (see FIG. 2). Each printhead module 210 is removably mounted on the platform 150. The printhead platform 150 can be supported by and form part of a gantry 130. An actuator system 152 allows the printhead platform 150 to move across the platen 105 (for example, along the y-axis). The platform 150 and the platen 105 are separate from one another, and neither supports the other. For example, the platform 150 is not mounted on the platen 105.

A controller 190 controls various aspects of the additive manufacturing process. For example, the controller 190 controls the actuator system 152 and therefore the motion of the printhead platform 150. The controller 190 can also control the relative motion and operation of printhead modules (not shown) included in the printhead platform 150. The controller can also control the operation of various "global" printing components included in the printhead platform 150.

Figure 1B:
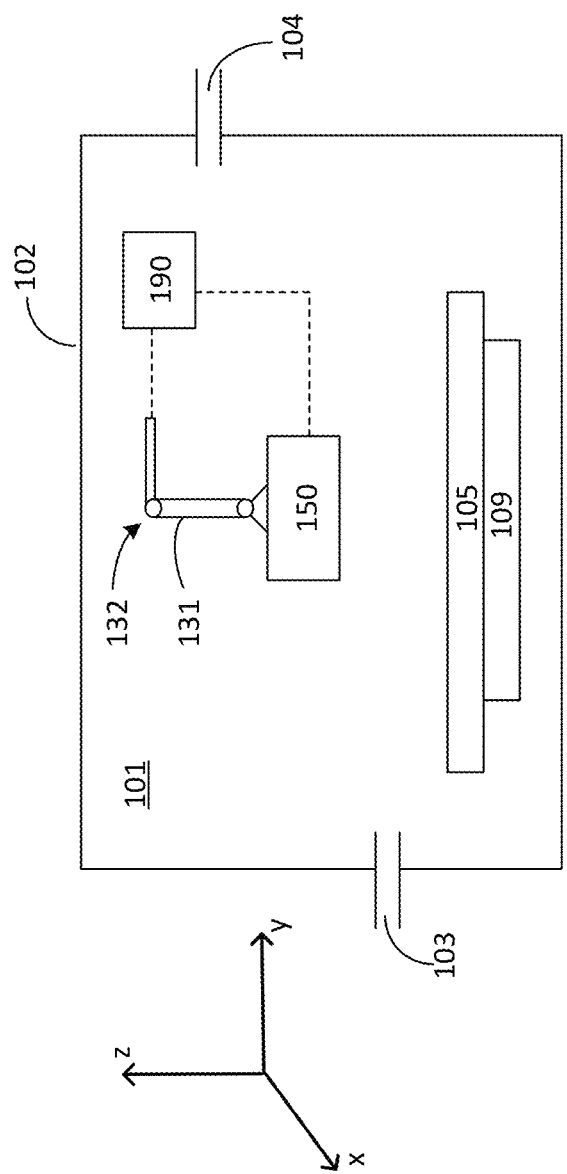
FIG. 1B illustrates a schematic of an exemplary additive manufacturing system.

In FIG. 1B, the printhead platform 150 is attached to a robot arm 131 of a robot 132 that can move the printhead platform 150 over the platen 105. Again, each printhead module 210 (see FIG. 2) is removably mounted on the platform 150. The motion of the robot arm 131 is controlled by the controller 190.

The printhead platform 150 can be a generally rectangular plate with apertures into which the printhead modules 210 are fit. Although FIGS. 1A and 1B both show a platform that is a generally horizontal plate, the support can have other forms, e.g., the support can be a frame or a vertical plate to which the modules are secured. It should be understood that discussion of attachment of the components to the printhead platform can be applied to attachment of the components to the printhead support.

FIG. 2 is a top view of the exemplary additive manufacturing system illustrated in FIG. 1A. The printhead platform 150 is mounted on the rails 130a and 130b of the gantry 130. By sliding over the rails 130a and 130b of the gantry 130—for example, by an actuator—the printhead platform 150 can traverse over the platen 105 (along y axis).

The printhead platform 150 includes one or more printhead modules 210. As noted above, each printhead module 210 is removably mounted on the platform 150.

In addition, the printhead 210 and the components in the printhead, e.g., the dispenser, heat source and energy source, are configured such that they can be mounted and dismounted as a single unit from the platform 150. This permits easier construction and repair of the additive manufacturing system 100.

As shown in FIG. 2, the printhead modules 210 are arranged in a staggered fashion so as to span the entire width of the platen 105. This permits a layer of the object to be fabricated with a single pass of the platform 150 over the platen 105. The printhead modules 210 perform the additive manufacturing process on rectangular strips of feed material deposited on the platen.

The platform 150 can also support global printing components 220 and 222. These global printing components are mounted directly on the platform 150, rather than on the frame of a printhead module 210. Printing component 220 can be a global dispenser that can dispense and smooth the deposited feed material. Printing component 220 and/or 222 can be a global metrology system that can measure various parameters associated with the additive manufacturing process. The global metrology system can comprise one or more of a sensor, a thermal imager or an optical camera.

In one implementation, as the system 150 moves from left to right (along +y direction) across the platen 105, a first global metrology system 220 forms the leading edge of the system, followed by the printhead modules 210 which in turn are followed by a second global metrology system 222 at the end. The global metrology system 220 at the leading edge of the system 150 can therefore measure various parameters such as the temperature and/or vertical position of the surface, e.g., the platen or underlying layer, onto which the layer will be deposited. This data can be fed to the controller 190 to control operation of the printhead modules 210. For example, if the feed material dispenser is controllable, measurements of the height of the surface can be used by the controller to determine an amount of material to dispense to improve layer thickness uniformity. Similarly, the data on the temperature of the layer can be used to control the power delivered to the heat source and/or energy source so that the portions to be fused are raised to a uniform temperature. The global metrology system 222 at the trailing edge of the system 150 can measure the various parameters associated with the additive manufacturing process, for example, the temperature and/or surface roughness of the fused/melted feed material. Again, this data can be fed to the controller 190 to control operation of the printhead modules 210, e.g., in a feedback loop to provide improved uniformity.

In some implementations, the global metrology system 222 can be divided into several segments along the x direction such that each segment of the metrology system is responsible for taking measurements of feed material fused by one or more printhead modules.

In some implementations, the additive manufacturing process can be one-directional, i.e., the additive manufacturing process only occurs when the system 150 is moving from left to right or from right to left. In another example, the additive manufacturing process can be bi-directional, i.e., the additive manufacturing process occurs when the system 150 is moving both from left to right and from right to left. The global printing components 220 and 222 can either be similar (for bi-directional printing) or different (for unidirectional printing).

Figure 3:
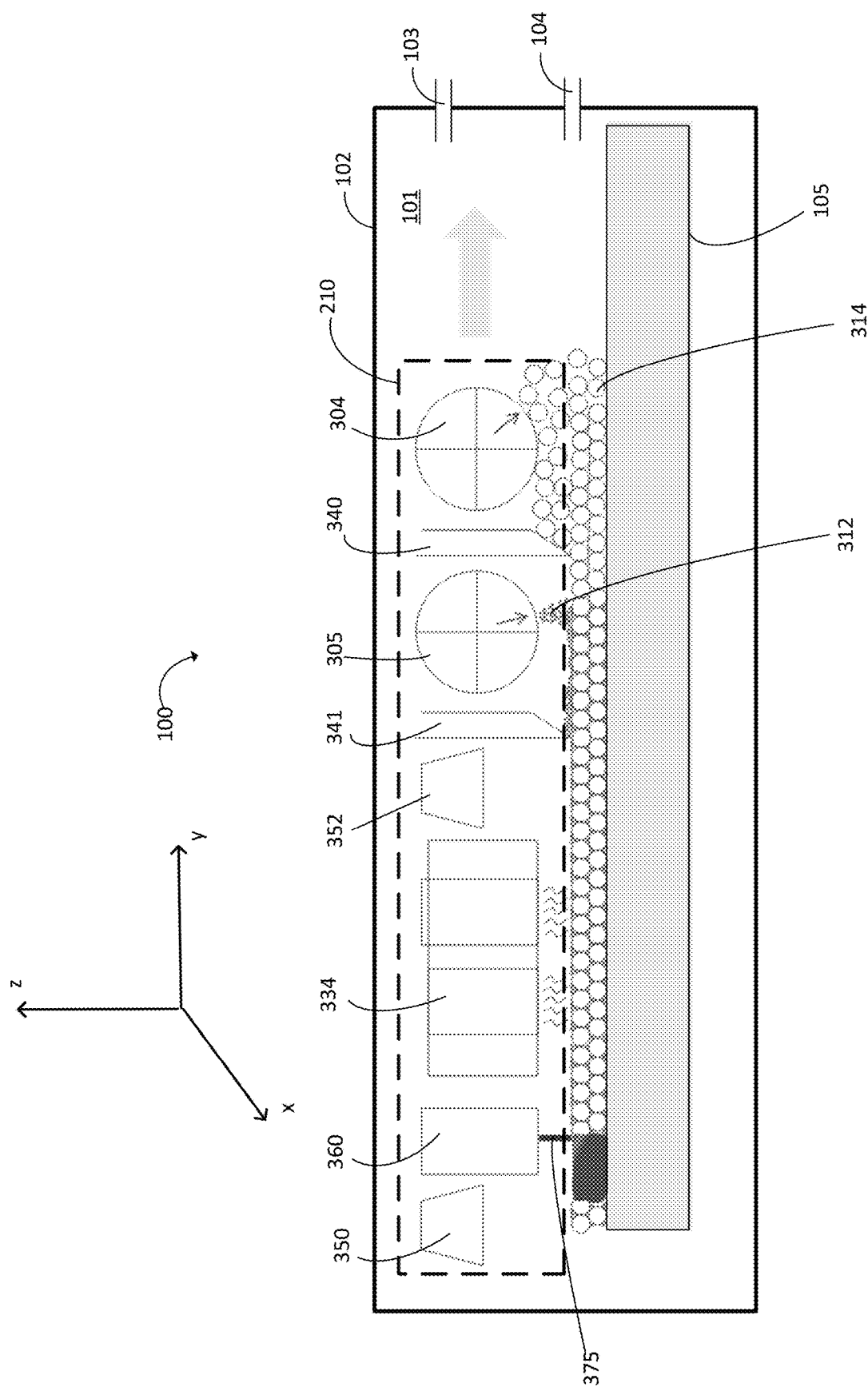
FIG. 3 is illustrates a side view of a printhead module.

FIG. 3 is a schematic illustration of the additive manufacturing process by the printhead module 210. The additive manufacturing system 100 includes a printhead module 210 that can move over the platen 105 (for example, along y direction) and perform the additive manufacturing process. The various printhead components of the printhead module are arranged along the direction of the additive manufacturing process (for example, along +y direction). Additionally, in some implementations the printhead components can move (for example, by an actuator or a motor) relative to the frame of the printhead module. In what follows, the printhead components will be described in the order in which they perform the additive manufacturing process on a given strip of deposited feed material under the printhead module 210.

The printhead module includes a first dispenser 304 (which is on the leading edge of the printhead module 210) that deposits a first feed material 314. A first spreader or levelling/smoothing arm 340 (for example, a roller or a blade (or knife-edge)) follows the dispenser 304 and disperses/smooths the deposited feed material evenly across the platen 105.

An optional second dispenser 305 can follow the first dispersion mechanism 340 to deposit a second feed material 312. Feed materials 312 and 314 can be of different sizes, shapes and/or can have different melting temperatures. For example, the second feed material 312 can be smaller than the first feed material 314, and may therefore fill the interstitial spaces between the particles of feed material 314. In another example, the second feed material 312 can be an alloying additive or a binder material that behaves differently than feed material 314 when heated to process temperature. For example, feed materials 312 and 314 can have different sintering/melting temperatures. The second feed material dispenser 305 is followed by an optional second spreader or levelling/smoothing arm 341 (for example, a roller or a blade (or a knife-edge)) that disperses/smoothens the deposited feed materials 312 or previously levelled feed material 314.

The feed material can be a powder. For example, the feed material can be a powder of particles composed of metal, such as, for example, steel, aluminum, cobalt, chrome, and titanium, alloy mixtures, ceramics, composites, or green sand.

An optional metrology system 352 can follow the dispersion mechanism 341, and can comprise one or more of a profilometer, a thermal imager or an optical camera. It can, for example, measure the surface roughness of the deposited feed materials. Knowing the roughness of deposited feed material before fusing/melting the feed materials can help in improving the quality of the additive manufacturing process by controlling the manufacturing process.

Next is a heat source 334 to raise the temperature of the deposited feed material. In the embodiment described in FIG. 3 the heat source 334 is a heat lamp array. The heat lamp array 334 can heat the deposited feed material 312 (and 314 if present) to a temperature that is below its sintering or melting temperatures.

After the heat source 334 is an energy source 360 to fuse selected portions of the layer, e.g., by raising the temperature above its sintering temperature or melting temperature (and then permitting the portion to cool). For example, the energy source 360 can emit a beam 375. The beam 375 can, for example, be a laser beam generated by a laser, an ion beam generated by an ion source, or an electron beam generated by an electron gun. The beam 375 that can raise the temperature of one or both of the deposited feed materials to near or above their respective sintering or melting points.

Moreover, the energy source 360 can be selectively activated in order to selectively fuse desired regions of the deposited feed material. For example, the energy source 360 can emit the beam 375 that impinges certain portion of the platen, thereby melting one or both the feed material deposited in that portion. Selective heating of certain portions of the feed material by the energy source 360 can be achieved by moving the energy source 360 relative to the printhead module frame, or by moving the beam 375 over the feed material, or both, in conjunction with selective activation of the energy source 360.

For example, the energy source 360 can move along a direction (e.g., the x-axis) perpendicular to the motion of the printhead module (e.g., the y-axis) by a motor or an actuator that is controlled by the controller 190 (see FIG. 1A). In another example, the energy source 360 may not move relative to the printhead module frame. However, the energy source 360 may include a mechanism, for example, a mirror mounted on a galvo or a piezoelectric micromirror device, that can deflect the beam 375 along the direction perpendicular to the direction of motion of the printhead module. The micromirror device may include a linear array of mirrors that are arranged along the direction perpendicular to the direction of motion of the printhead module. In all the aforementioned cases, the position of impingement of the beam 375 relative to the feed material changes.

Where two feed materials with different melting or sintering temperatures are used, the energy source 360 can raise the entire portion of the layer below the printhead module 210 to a temperature between the melting or sintering temperatures of the first feed material and the second feed material. Thus, only one of the feed materials will be fused. This eliminates the need for selective fusing by the energy source 360.

An optional second metrology system 350 follows the energy source 360. The second metrology system 350 can, for example, measure the properties (temperature, surface roughness etc.) of the melted feed material. This can be used by the controller to adjust the process parameters to improve the quality of the additive manufacturing process.

Figure 4:
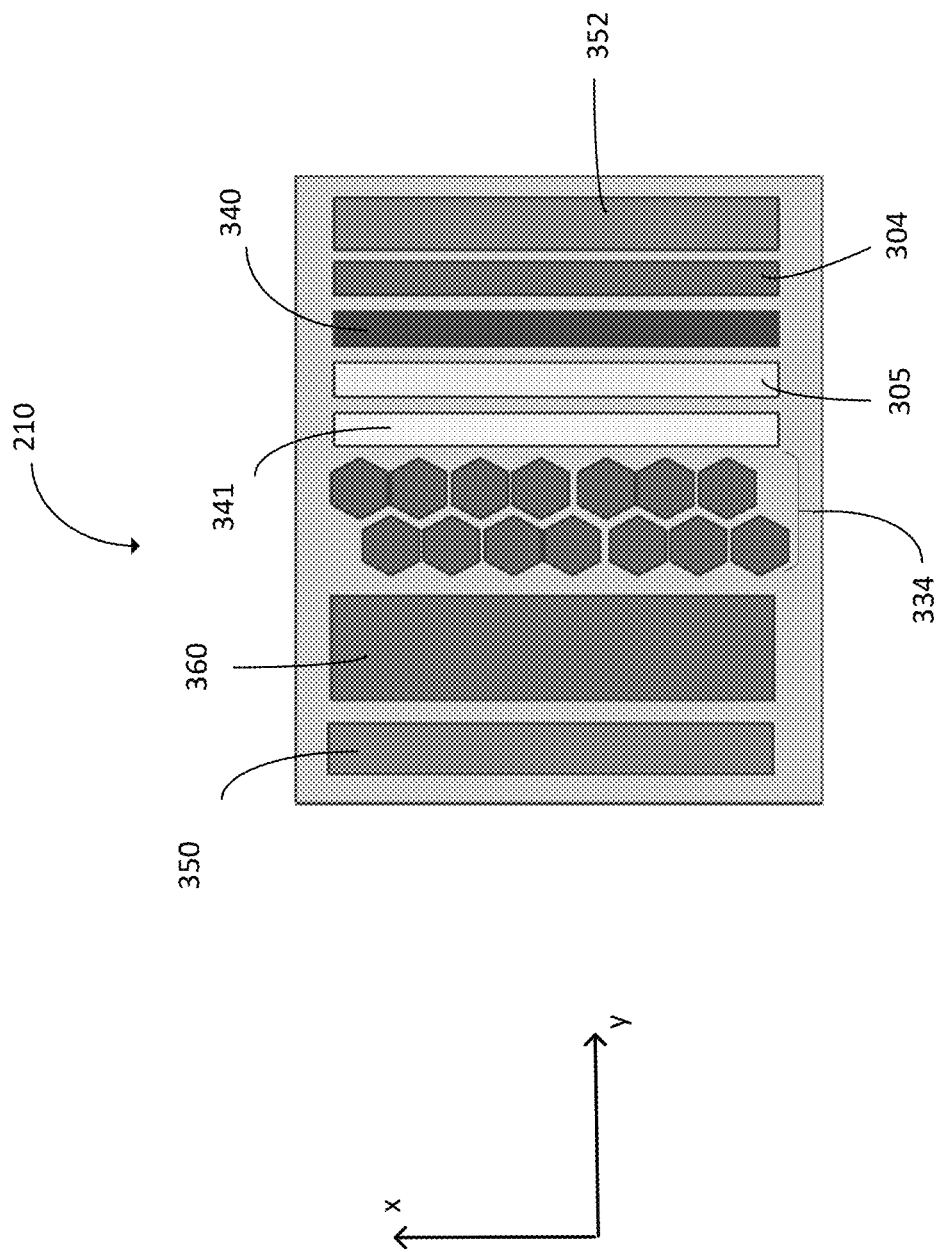
FIG. 4 illustrates a top view of a printhead module.

FIG. 4 illustrates a top view of an embodiment of printhead module 210 that is placed in the x-y plane above the platen (not shown). Because the module is configured to move from left to right over the platen (along +y direction), the right end of the module is the leading edge and the left end is the trailing edge. The module 210 includes a plurality of printhead components. For example, the printhead components include, in the order from leading edge to trailing edge, a metrology system 352, a first dispenser 304, a first dispersion mechanism 340 (for example, a roller or a blade), a second dispenser 305, a second dispersion mechanism 341 (for example, a roller or a blade), a first energy source 334 (for example, a heat lamp), a second energy source 360 (for example, a laser system) and a metrology system 350.

Figure 5:
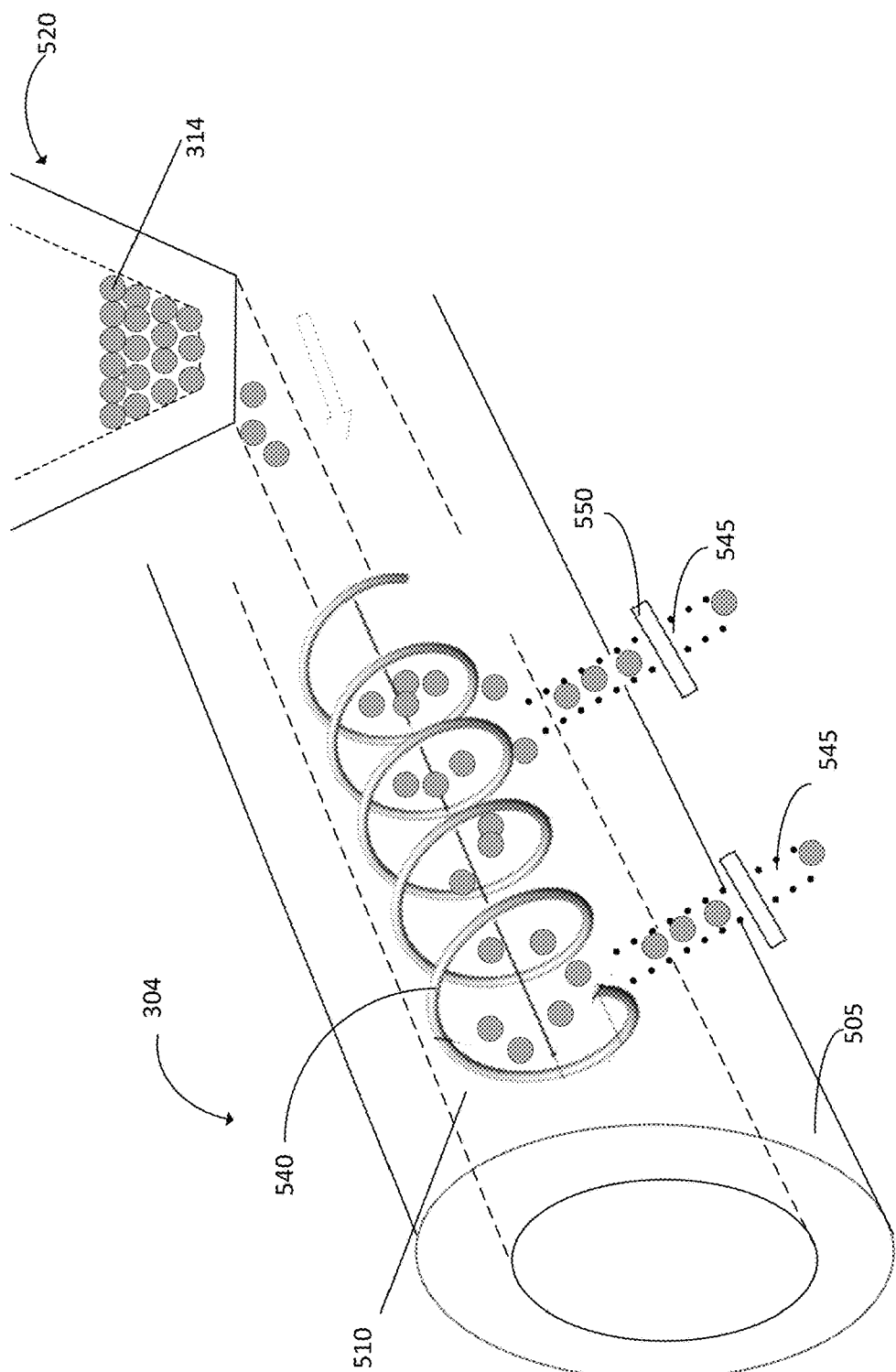
FIG. 5 illustrates a perspective view of a feed material dispenser.

FIG. 5 is a schematic illustration of the feed material dispenser 304 described in FIGS. 3 and 4. The dispenser 304 comprises of a conduit 505 (for example, a hollow cylinder) that extends across the width of the platen (along the x-axis) which is substantially perpendicular to the direction in which the printhead module moves (along x direction) during the additive manufacturing process. The conduit 505 is coupled to a hopper 520 which stores the feed material 314. The conduit 505 encloses a hollow space 510 and an auger 540. The auger 540 is rotatably mounted to the material dispenser 304, and a motor can rotate the auger 520, for example, by a drive shaft.

As the auger 540 rotates, it draws in feed material 314 from the hopper 520. The conduit 505 can have a plurality of openings 545 arranged along its length (along x direction) from which the feed material 314 can be dispensed onto the platen. The rate of flow of the feed material 314 through the openings 545 can be regulated by an actuator 550 which can be controlled by a controller 190 (not shown). The rate of flow of feed material 314 can also be controlled by changing the rate of rotation of the auger 540. For example, increasing the rate of rotation of the auger 540 can increase the rate at which feed material is dispensed and vice-versa. In other examples, the conduit 505 can have a continuous slot along the length of the conduit (along x axis).

The dispenser 304 can be configured to dispense the feed material beyond the edge of the module 210. For example, the dispenser could include an ejector that ejects the feed material in a fluid carrier through nozzles, and the nozzles could be positioned at an angle relative to the platen surface such that the feed material is dispensed on a portion of the platen that lies beyond the extent of the dispenser in the x direction. This feature can be useful to deposit the feed material in regions of the platen that are not directly under the dispenser 304. This ensures, for example, that if there is a gap between two adjacent printhead modules of a printhead platform, feed material will be deposited on the portion of the platen that lies underneath the gap. Also, this ensures that the feed material can be deposited to a part of the platen that is not directly underneath a printhead module, for example, regions close to the edge of the platen.

Alternatively or in addition, the dispenser 304 can be configured to deliver more feed material to at the edges of the printhead module 210 (along the x-direction) than at the center of the printhead module. For example, the holes at the two ends of the conduit 505 (along the x-direction) can be larger (or more closely spaced) than the holes at the center of the conduit 505. A spreader, e.g., a blade or roller, the spreader 340, can then be used to spread the extra feed material into the gap between two adjacent printhead modules of a printhead platform.

Figure 6:
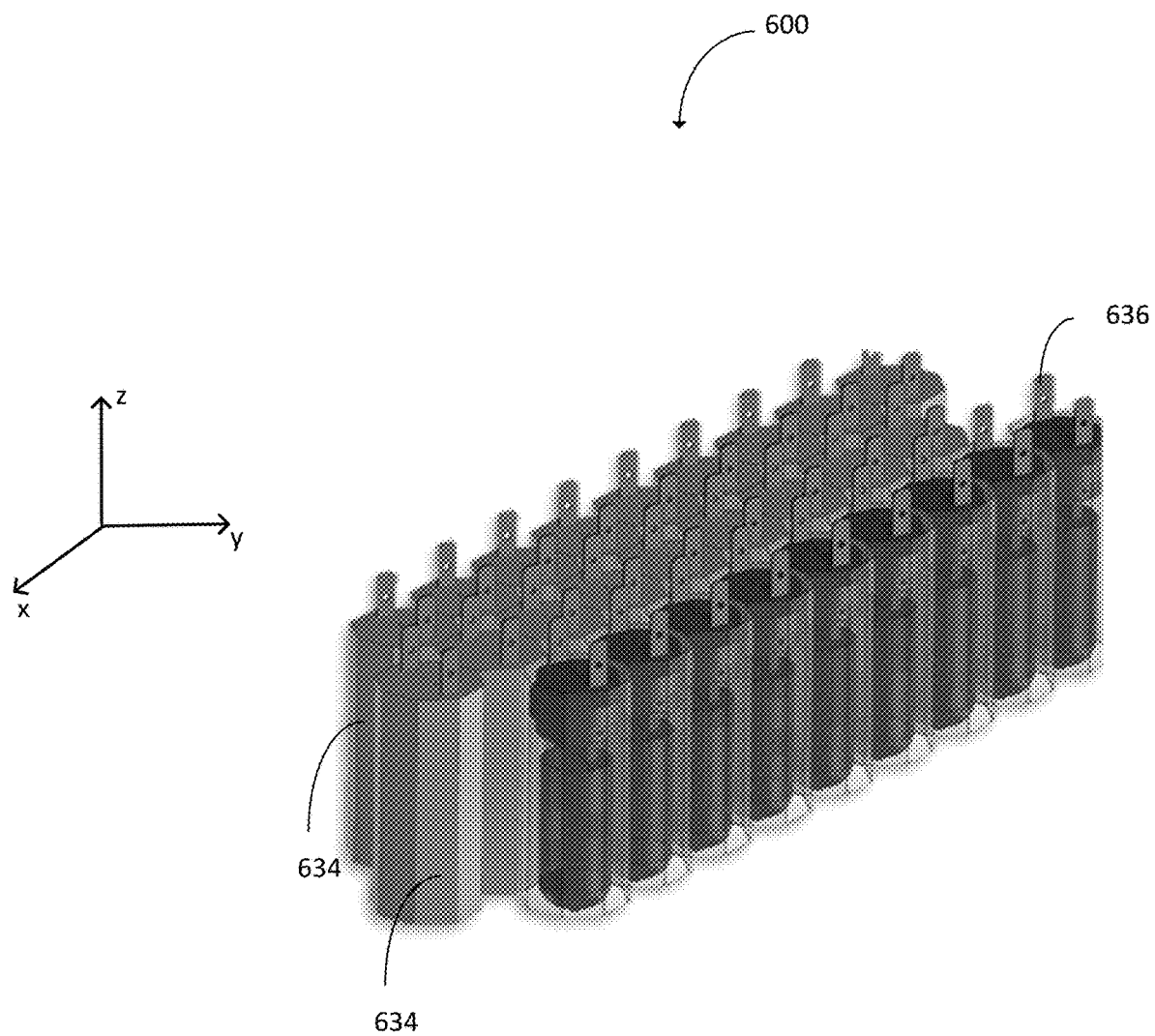
FIG. 6 illustrates a heat lamp array.

FIG. 6 illustrates a heat a heat lamp array 600 that can be included in the printhead module as an energy source, for example, energy source 334 in FIGS. 3 and 4. The heat lamp array 600 comprises a plurality of heat lamps 634 that are arranged in an array, for example, a hexagonal closest packed array. Each heat lamp 634 can be connected to a power source through one or more pins 636.

The energy delivered to each heat lamp 634 can be controlled by a controller (for example, the controller 190 in FIG. 1). Changing the energy delivered to each of the heat lamp can change the energy radiated by the heat lamp. Therefore, the spatial distribution of energy generated by the heat lamp array can be controlled by the controller. As a result, the portion of the feed material deposited on the platen that receives energy from the heat lamp array 600 can have a temperature distribution. In other words, the heat lamp array 600 can provide control of the temperature distribution of the aforementioned portion of the deposited feed material.

In FIG. 6, the heat lamp array 600 is arranged along the z axis, and is therefore perpendicular to the feed material on the platen (which is in the x-y plane). However, the heat lamp array 600 can also be arranged at other angles to the platen. For example, the lamps could be angled in the y-z plane to move the region heated closer to the point at which the feed material is dispensed. As another example, lamps at the edges of the array (along the x-axis) could be angled outwardly (in the x-z plane) to provide heat to any feed material into a gap between two adjacent printhead modules of a printhead platform.

Figure 7:
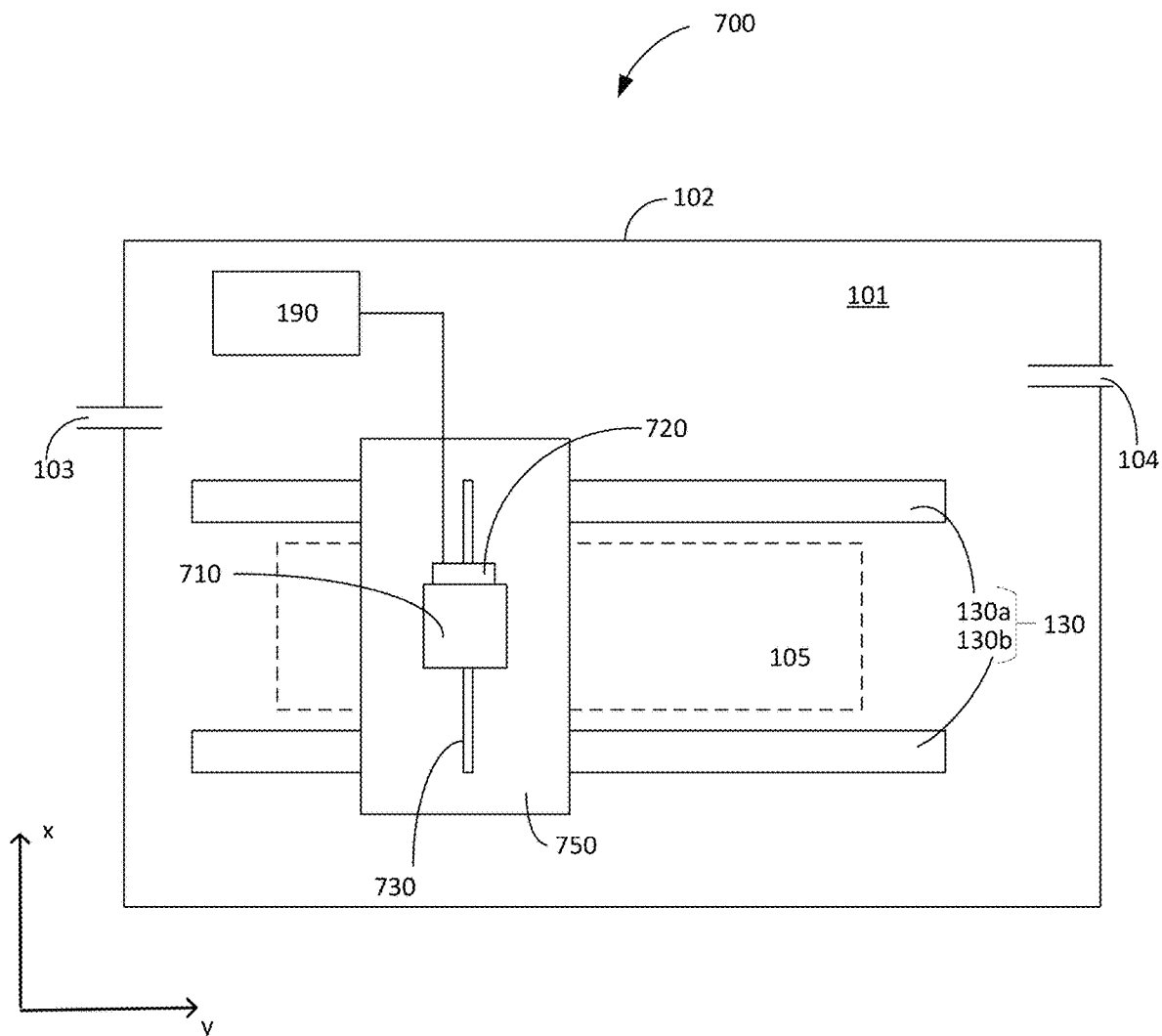
FIG. 7 illustrates a schematic of an exemplary additive manufacturing system.

FIG. 7 illustrates a top view of an example of an exemplary additive manufacturing system 700. As described in FIG. 2, system 700 includes and is enclosed by a housing 102. The housing 102 can, for example, allow a vacuum environment to be maintained in a chamber 101 inside the housing. Alternatively the interior of the chamber 101 can be a substantially pure gas, e.g., a gas that has been filtered to remove particulates, or the chamber can be vented to atmosphere. The gas can enter the chamber 101, from a gas source (not shown), through a gas inlet 103. The gas from the chamber can be removed through a vacuum vent 104.

The printhead platform 750 is mounted on the rails 130a and 130b of the gantry 130. By sliding over the rails 130a and 130b of the gantry 130, the printhead platform 750 can traverse over the platen 105 (along y direction). The platform 750 supports a printhead module 710 that can be, for example, the printhead modules described in FIG. 2, 3 or 4. The printhead module 710 is mounted on a track 730 and can move along the tracks in the x direction by an actuator 720. The actuator, and therefore the position of the module 710 in the system 750 can be controlled by the controller 190.

In the additive manufacturing system 700, the printhead platform 750 moves along the length of the platen (y axis) incrementally. For each incremental motion of the printhead platform 750, the printhead module 710 moves from one end of the platen to another along its width (along the x direction). Coupling of the motion of the printhead platform 750 (along y direction) with the motion of the printhead module (along x direction), allows the additive manufacturing process to be performed over the entire platen.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

The controller 190 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 190 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 190, e.g., as controlled by firmware or software, can interpret the data object received from the computer to generate the set of signals necessary to control the components of the apparatus 100 to fuse the specified pattern for each layer.

A number of implementations have been described. Nevertheless, it will be understood that various modifications may be made. For example,

- The module need not include the heater. The heater can be a global component, or be mounted on walls of the chamber.
- The module need not include the energy source. The energy source can be a global component, or be mounted on walls of the chamber.
- Rather than the printhead support moving, the printhead support can remain stationary while the platen moves laterally to provide the relative motion between the printhead assembly and the platen.

Accordingly, other implementations are within the scope of the claims.

What is claimed is:

1. A module for an additive manufacturing system, comprising:
   a frame configured to be removably mounted on a support that is movable along a first axis;
   a dispenser configured to deliver a layer of particles on a platen that is separate from the frame, or an underlying layer on the platen;
   an energy source comprising a light source or electron gun configured to generate a beam to fuse the particles; and
   a metrology system having a first sensor to measure a property of a surface of the layer before being fused and a second sensor to measure a property of the layer after being fused;
   wherein the dispenser, first sensor, energy source and second sensor are positioned on the frame in order along the first axis, and wherein the dispenser, first sensor, energy source and second sensor are fixed to the frame such that the frame, dispenser, first sensor, energy source and second sensor can be mounted and dismounted as a single unit from the support.

2. The module of claim 1, wherein the first sensor is configured to measure a surface roughness or temperature of the layer.

3. The module of claim 1, wherein the second sensor is configured to measure a surface roughness or temperature of the layer.

4. The module of claim 1, wherein the first sensor is configured to measure a surface roughness of the layer and the second sensor is configured to measure a temperature of the layer.

5. The module of claim 1, further comprising a roller or blade extending along a second axis perpendicular to the first axis and configured to smooth the layer of particles.

6. The module of claim 5, wherein the blade is positioned between the dispenser and the first sensor.

7. The module of claim 5, wherein the blade is fixed to the frame such that the frame, dispenser, blade, first sensor, energy source and second sensor can be mounted and dismounted as a single unit from the support.

8. The module of claim 1, further comprising a heat source configured to heat the layer of particles to a temperature below a temperature at which the particles fuse.

9. The module of claim 8, wherein the heat source is positioned between the first sensor and the light source.

10. The module of claim 8, wherein the heat source is fixed to the frame such that the frame, dispenser, first sensor, heat source, energy source and second sensor can be mounted and dismounted as a single unit from the support.

11. The module of claim 8, wherein the heat source comprises an array of heat lamps.

12. The module of claim 11, wherein the heat lamps are disposed in a hexagonal closest packed array.

13. The module of claim 11, wherein the heat lamps are arranged with longitudinal axes at a non-zero angle relative to vertical.

14. The module of claim 1, wherein the energy source is configured to move a spot of impingement of the beam on the layer of particles along a second axis perpendicular to the first axis.

15. The module of claim 14, wherein the energy source is slidably mounted to the frame so as to be movable along the second axis by a motor.

16. The module of claim 15, wherein the energy source is configured to deflect the beam along the second axis perpendicular to the first axis.

17. An additive manufacturing system, comprising:
    a platen to support an object being fabricated;
    a dispenser configured to deliver a succession of layers of particles over the platen, the dispenser movable along a first axis and including a slot or plurality of openings extending along a second axis perpendicular to the first axis, and wherein the dispenser is configured to dispense particles to a region on the second axis that extends beyond an edge of the dispenser; and
    an energy source comprising a light source or electron gun configured to generate a beam to fuse particles in an uppermost layer of the succession of layers.

18. The system of claim 17, comprising a frame and a motor to move the frame along the first axis, and wherein the dispenser is mounted to the frame and the dispenser is configured to dispense particles at least up to an edge of the frame.

19. The system of claim 17, wherein the dispenser comprises a reservoir to hold the particles and a conduit coupled to the reservoir and extending along the second axis, the slot or plurality of openings extending from the conduit.

20. The system of claim 17, wherein the dispenser comprises a plurality of nozzles and the dispenser is configured to eject the particles in a carrier fluid through the nozzles.

* * * * *